United States Patent [19]  
Nishihara et al.

[11] 3,893,064  
[45] July 1, 1975

[54] SIGNAL DISCRIMINATING DEVICE

[75] Inventors: Motohisa Nishihara; Yomei Kato, both of Hitachi, Japan

[73] Assignee: Hitachi, Ltd., Japan

[22] Filed: Mar. 28, 1973

[21] Appl. No.: 345,489

[30] Foreign Application Priority Data
Mar. 29, 1972 Japan.............................. 47-31494

[52] U.S. Cl............. 340/6 R; 340/16 R; 343/112 D
[51] Int. Cl............................................. G01s 11/00
[58] Field of Search........ 340/5 R, 6 R, 16 R, 16 C; 343/112 D, 112 R; 328/167

[56] References Cited
UNITED STATES PATENTS
3,638,174  1/1972  Haase et al. ....................... 340/5 R
3,742,440  6/1973  Ehrlich et al. ..................... 340/5 R
3,792,424  2/1974  Nakatsuji et al. .................. 340/6 R

*Primary Examiner*—Richard A. Farley
*Attorney, Agent, or Firm*—Craig & Antonelli

[57] ABSTRACT

A signal discriminating device comprising a band-pass filter for selectively passing a signal-frequency component at a predetermined frequency and another band-pass filter for selectively passing a noise-frequency component at a frequency other than but close to the signal frequency, wherein the discrimination of signal from noise is effected on the basis of existance or non-existance of the signal-frequency component and the noise-frequency component in such a manner that when only the signal-frequency component is detected the reception of signal is determined and when both the signal-frequency component and the noise-frequency component are simultaneously detected the reception of noise is determined.

20 Claims, 10 Drawing Figures

SIGNAL DISCRIMINATING DEVICE

This invention relates to a signal discriminating device for identifying received sound waves or electric waves as desired (or true) signal or noise.

It is well known in the art that sound wave receiving systems are prone to malfunctioning due to intense noises such as those generated by friction between metals or rigid bodies and impact sounds generated when bodies strike each other, and it is also known that electromagnetic wave receiving systems are adversely affected by electric sparks and electric noises resulting from the make-and-break actions of relays.

Therefore, where sound waves or electromagnetic waves are received it is necessary to determine whether the received wave is signal or noise.

This necessity arises, for example, when determining the distance of a moving object or target from a reference point from the time required until a sound wave or electromagnetic wave sent forth from a sound wave or electromagnetic wave generator mounted in an object reaches a reference point, or the time required until a sound wave or electromagnetic wave generated to an object from a sound wave or electromagnetic wave generator mounted at a reference point is reflected from the object and again reaches the reference point. In such case, however, correct measurement of the distance cannot be obtained if the measurement happens to be executed in response to a noise arriving at the reference point before the arrival of the sound or electromagnetic wave from the generator.

For example, the need for correctly measuring the distance of moving object or target exists in the field of the recently highlighted marine development where a working apparatus such as underwater bulldozer for readjusting the sea bed is operated under remote control from a ship. In this case, it is necessary to continuously monitor the location of the working apparatus. To this end, it has been proposed to constantly measure the distance of the working apparatus from reference points (usually 2 or 3 points) by utilizing ultrasonic wave so as to locate the position of the apparatus and display the located position on a display tube such as a Brawm tube. However, if erroneous measurement is effected in response to noise, an incorrect position would be displayed so that the working apparatus are prone to the accident of striking against one another or against a rock.

The impact sounds that are generated when striking a metal piece or when cracking a rock have wide spectra containing components at frequencies lying in a broad frequency range extending several megacycles beyond the audible range although they are generated only momentarily. It is also well known that the higher the resonant frequency of the metal piece or rock experiencing an impulse force, that is, the more rigid the metal piece or rock is, the higher the frequencies that are contained in the frequency spectrum of the impact sound generated. The underwater bulldozers breaking sea bottom rocks and underwater pile drivers driving piles into the sea bed are the sources of very intense sound noise, and if the signal frequency lies within the frequency spectrum of the very intense noise erroneous measurement is likely to be done in response to a signal-frequency component of the noise, leading to the afore-mentioned accident.

While the evil of responding to noise in the measurement the object distance with sound wave has been mentioned above, there are various situations or fields where it is very important and necessary to correctly and reliably discriminate signal from noise in the reception of not only sound waves but also electromagnetic waves.

An object of the present invention, accordingly, is to provide a signal discriminating device which enables correct and reliable discrimination of signal from noise.

According to one aspect of the invention, there is provided a signal discriminating device comprising a first selective amplifier means for selectively amplifying a first signal of a predetermined frequency, a second selective amplifier means for selectively amplifying a second signal of a frequency other than the predetermined frequency of said first signal, and a detecting means to detect the outputs of said first and second means, the output of said first means being identified as a desired signal when only said first means produces the output.

According to another aspect of the invention, there is provided a signal discriminating device comprising a first selective amplifier means for selectively amplifying a first signal of a predetermined frequency, a second selectively amplifier means for selectively amplifying a second signal of a frequency other than the predetermined frequency of said first signal, and a comparator means to compare the levels of the outputs of said first and second means, the output of said first means being identified as a desired signal only when the level of the output of said first means is higher than that of said second means.

Where signals are successively transmitted, the instant of arrival of signal is predicted and only signals arriving during predetermined periods before and after the predicted instant.

Figure 1:
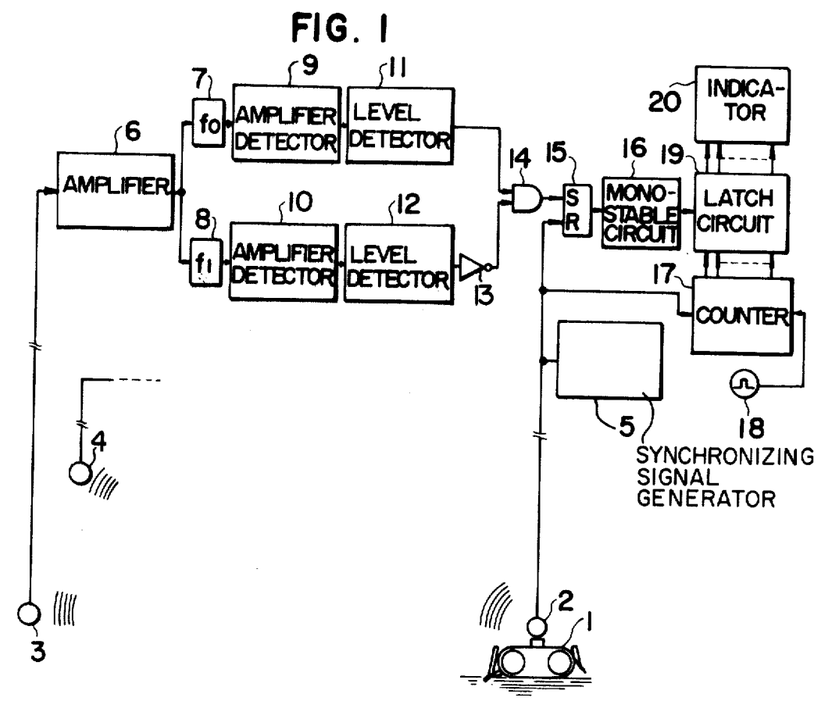
FIG. 1 is a block diagram showing an embodiment of the invention.

The above and other objects and features of the invention will become apparent when reading the following detailed description in conjunction with the accompanying drawings in which:

FIG. 1 shows one embodiment of the invention applied to the measurement of the distance of an underwater bulldozer from reference positions.

In FIG. 1, reference numeral 1 designates an underwater bulldozer, numeral 2 a transmitter mounted in the underwater bulldozer, numerals 3 and 4 receivers located in reference positions, numeral 5 a synchronizing signal generator, numeral 6 an amplifier, numerals 7 and 8 band-pass filters, numerals 9 and 10 amplifierdetectors, numerals 11 and 12 level detectors, numeral 13 an inverter, numeral 14 an AND gate, numeral 15 a flip-flop of set-and-reset type, numeral 16 a monostable circuit, numeral 17 a counter, numeral 18 a clock pulse generator to generate clock pulses for driving the counter 17, numeral 19 a latch circuit, and numeral 20 an indicator to indicate the content of the latch circuit 19.

In FIG. 1, only the circuitry for measuring the distance between the underwater bulldozer 1 (transmitter 2) and the receiver 3 is shown.

The operation of the above circuitry will now be described by also having reference to FIG. 5 which shows a frequency spectrum of sound noise N including a frequency component at signal frequency $f_0$. The syncronizing signal generator 5 produces syncronizing pulses at a constant pulse frequency. As soon as each syncronizing pulse appears the transmitter 2 sends forth an ultrasonic wave at the signal frequency $f_0$. Synchronously, the flip-flop 15 is reset and also the counter 17 is cleared, that is, its content is reduced to zero, whereupon it starts again the counting of clock pulses produced from the clock pulse generator 18. The ultrasonic wave sent forth from the transmitter 2 propagates through water and is intercepted by the receiver 3. The wave intercepted by the receiver 3 is amplified through the amplifier 6 before it is coupled to the band-pass filters 7 and 8. The band-pass filter 7 selectively passes a frequency component at the frequency $f_0$, while the band-pass filter 8 selectively passes a frequency component at a frequency of $f_1$ different from $f_0$. The outputs of the band-pass filters 7 and 8 are amplified through the respective amplifier-detectors 9 and 10 whose outputs are coupled to the respective level detectors 11 and 12. The level detectors 11 and 12 produce their outputs if their inputs, i.e., outputs of amplifier-detectors 9 and 10 exceeds a preset reference level. The output of the level detector 11 is directly coupled to the AND gate 14, while the output of the level detector 12 is coupled through the inverter 13 to the AND gate 14. Accordingly, the AND gate 14 produces an output if the level detector 11 provides an output and only the level detector 12 provides no output. Upon appearance of the output from the AND gate 14 the flip-flop 15 is set to produce an output, whereupon the mono-stable circuit 16 is triggered. The output pulse from the mono-stable circuit 16 actuates the latch circuit 19 to read out and memorize the prevailing content of the counter 17. The registered content of the counter 17 represents the time taken for the propagation of the ultrasonic wave from the transmitter 2 to the receiver 3, and hence it corresponds to the distance between the reference location of the receiver 3 and the underwater bulldozer 1 since the speed of propagation of ultrasonic wave through water is known. The content of the latch circuit 19 is displayed by the indicator 20.

Subsequently, the syncronizing pulse generator 5 delivers the next syncronizing pulse a predetermined time after the preceding one, thereupon resetting the flip-flop 15 and clearing the counter 17 to repeat the same sequency of events for measuring the distance of the bulldozer 1.

In the above measurement of the distance, it will be understood that if the sound wave received by the receiver 3 solely consists of a wave at frequency $f_0$, it is passed through the band-pass filter 7 to cause an output from the level detector 11. On the other hand, it is not passed through the band-pass filter 8 to cause no output from the level detector 12, thus causing an output from the inverter 13. As a result, the AND gate 14 produces an output so that the measurement of the distance can be effected.

Figure 5:
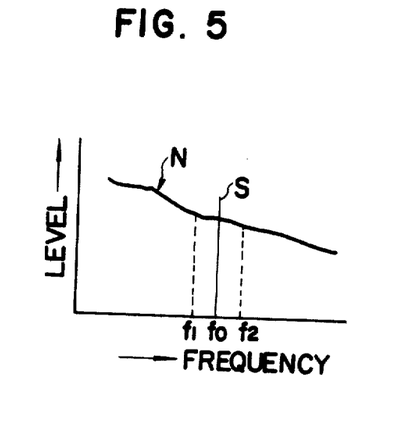
FIG. 5 is a graph showing a frequency spectrum of noise.

The receiver 3 may sometimes receive noise N whose frequency spectrum, as shown in FIG. 5, covers an ultrasonic frequency band extending several megacycles beyond the audible frequency band. While the spectrum varies with the types of noise, the noise spectra of two frequency components that are very close to each other are substantially at the same level. Accordingly, if the pass frequencies $f_0$ and $f_1$ of the band-pass filters 7 and 8 are set to be very close to each other, the band-pass filters 7 and 8 will respectively pass $f_0$ and $f_1$ components which are substantially at the same level. If the level detector 11 produces an output due to an $f_0$ component of noise N at a level above the preset level of the level detector 11, the level detector 12 will also produce an output since an $f_1$ component of noise N will be nearly at the level of the $f_0$ component, the latter output causing the inverter 13 to produce no output. As a result, the AND gate 14 does not produce any output. In this way, erroneous measurement of the distance due to noise N can be precluded. While the measuring system is not actuated in response to noise N that is received during the propagation of the wave front of the ultrasonic wave sent forth from the transmitter 2 since the AND gate 14 does not produce any output, it is actuated upon reception of the desired or true signal. Thus, only correct measurements of the distance can be reliably effected.

If noise N and signal S are simultaneously received, the measuring system is held inoperative so that in this time no measurement is done and the latch circuit 19 holds its previous content.

The frequency $f_1$ need not be lower than $f_0$ and may be a frequency $f_2$ higher than $f_0$ depending upon the frequency spectrum of possible noise N.

Also, similar discrimination may be obtained by existence or non-existence of the $f_0$ component and the mean of $f_1$ and $f_2$ components respectively lower and higher in frequency than the $f_0$ component.

Further, while in the preceding embodiment the discrimination of signal S from noise N has been made in terms of whether or not there are a signalfrequency component at $f_0$ and another frequency component at a frequency $f_1$ other than the signal frequency $f_0$, the discrimination can also be made by comparing the levels of both frequency components.

Namely, assuming that the frequency spectrum of noise N is as shown in FIG. 5 and $e_0$ and $e_1$ are respectively the levels of the $f_0$ and $f_1$ components, we will have $e_0 > e_1$ when signal S is received and we will have $e_1 > e_0$ when noise N is received.

Figure 2:
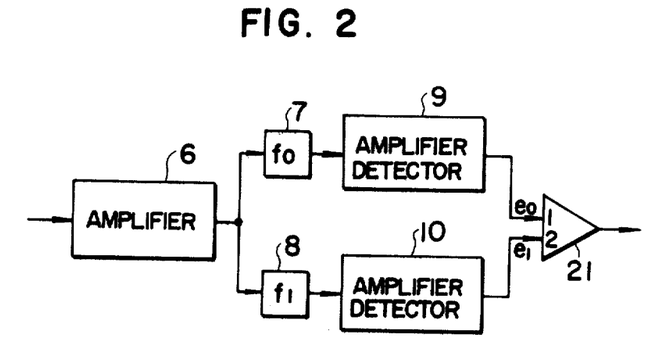
FIGS. 2 to 4 are block diagrams showing other embodiments of the invention.

FIG. 2 shows an embodiment in which the discrimination is made through the comparison of levels. In the Figure, the same reference numerals as those in FIG. 1 designates like parts, and numeral 21 designates a level comparator which produces an output when $e_0 > e_1$.

If signal S is received, only the amplifier-detector 9 produces an output and the amplifier-detector 10 does not produce any output, that is, $e_0 > e_1$. As a result, the comparator 21 produces an output which is coupled to the flip-flop 15 shown in FIG. 1.

If noise N is received, the amplifier-detectors 9 and 10 produce respective outputs of substantially the same level, provided that the frequencies $f_0$ and $f_1$ are close to each other as shown in FIG. 5. In this case, we may have $e_1 > e_0$ if the amplification degree of the amplifier-detector 10 is set to be slightly higher than that of the amplifier-detector 9. Then, the comparator 21 will not produce any output. In this way, the measuring system can be held inoperative in response to noise N.

In order to reliably have $e_1 > e_0$ upon reception of noise N and preclude mis-discrimination, it is effective to apply a small positive bias to the output terminal of the amplifier-detector 10.

If signal S and noise N are simultaneously received, the output of the amplifier-detector 9 represents the sum of the signal S and the $f_0$ component of the noise N so that $e_0 > e_1$ and the comparator 21 produces an output. Thus, the discrimination of signal S and noise N can be reliably made.

Again in this embodiment, the frequency $f_1$ need not be lower than $f_0$ and may be a frequency $f_2$ higher than $f_0$ depending upon the frequency spectrum of possible noise N.

Figure 3:
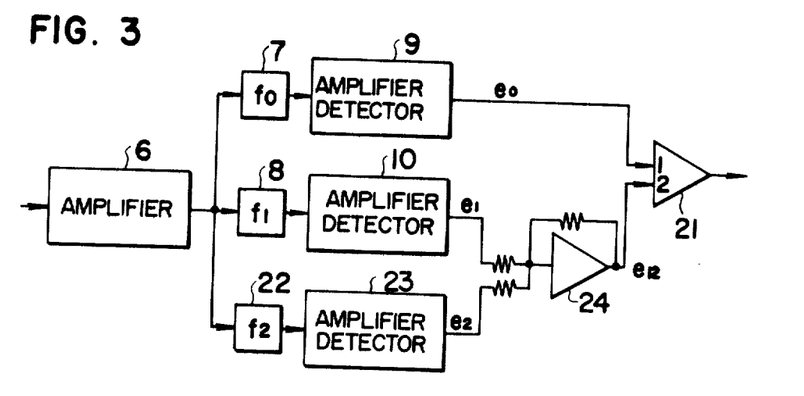

FIG. 3 shows a further embodiment in which the discrimination is also effected through the comparison of levels. In this embodiment, the level of $f_0$ component and the mean level of $f_1$ and $f_2$ components respectively lower and higher in frequency than the $f_0$ component are compared.

In FIG. 3, the same reference numerals as those in FIG. 2 designate like parts, numeral 22 a band-pass filter to selectively pass a frequency component at a frequency $f_2$ higher than $f_0$, numeral 23 an amplifier-detector, and numeral 24 a mean level circuit to add the outputs $e_1$ and $e_2$ of the amplifierdetectors 10 and 23 and to produce an output the mean level $e_{12}$ of the outputs $e_1$ and $e_2$.

In operation, if signal S is received, only the amplifier-detector 9 produces an output $e_0$ so that the comparator 21 produces an output.

If noise N is received, by setting the amplification degrees of the amplifier-detectors 10 and 23 to be slightly higher than that of the amplifierdetector 9 we may have $e_{12} > e_0$ since the level of the output $e_{12}$ of the mean level circuit 24 is nearly equal to that of the output $e_1$ of the amplifierdetector 10. Then, no output is produced from the comparator 21.

Similar to the preceding embodiment of FIG. 2, it is effective to add a small positive bias to the output of the mean level circuit 24 in order to reliably have $e_{12} > e_0$ upon reception of noise N and preclude misdiscrimination. Alternatively, it is also possible to add a small bias not to the output but to the input to the mean level circuit 24.

If signal S and noise N are simultaneously received, only the output $e_0$ of the amplifier-detector 9 is increased similar to the embodiment of the FIG. 2 so that $e_0 > e_{12}$ and the comparator 21 produces an output.

It will be seen that with the embodiment of FIG. 3 the mean level of the $f_1$ and $f_2$ noise components respectively lower and higher in frequency than the $f_0$ component also contained in the noise N is compared with the level of signal S so that the discrimination of signal from noise N in case when signal S and noise N are superimposed can be made more reliably.

Here, if $f_0$ is set to 100 kHz, $f_1$ and $f_2$ are usually set as $f_1 = 90$ kHz and $f_2 = 110$ kHz. However, the frequency difference between $f_0$ and $f_1$ or $f_2$ may be varied in dependence upon the frequency spectrum of the noise N.

Figure 4:
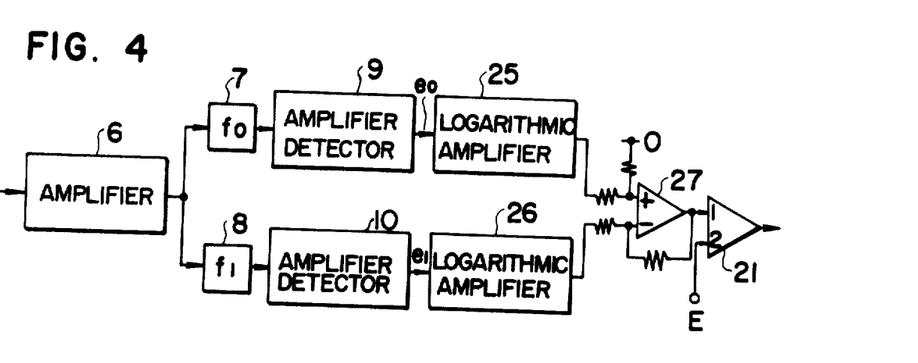

FIG. 4 shows a still further embodiment of the invention, in which it is determined that a signal is received if the signal-to-noise ratio between $f_0$ and $f_1$ frequency components exceeds a predetermined value.

In the FIG. 4, the same reference numerals as those in FIG. 2 designate like parts, numerals 25 and 26 designate logarithmic amplifiers, and numeral 27 a subtracting circuit.

The logarithmic amplifiers 25 and 26 execute logarithmic operation respectively with the outputs $e_0$ and $e_1$ from the amplifier-detectors 9 and 10. The outputs of the logarithmic amplifiers 25 and 26 are coupled to the subtracting circuit 27 which produces an output given as $$A \log e_0 - A \log e_1 = A \log \frac{e_0}{e_1} \qquad (1)$$

where $A$ is gain of the logarithmic amplifiers 25 and 26. The level comparator 21 compares the level of the output of the subtracting circuit 27 and a reference level E, and it produces an output if a relation $$A \log \frac{e_0}{e_1} > E \qquad (2)$$

is satisfied. The output of the level comparator 21 is coupled to the flip-flop 15 shown in FIG. 1.

In equation (2) can be represented with unit of decibel as follows:

$$20 \log \frac{e_0}{e_1} > \frac{20E}{A} \qquad (3)$$

It will thus be apparent that it is determined that signal S is received when the decibel value of $e_0/e_1$ exceeds the value of the right side of inequality (3). For example, if the value of the right side of inequality (3) is 10 decibels, it is determined that signal S is received when $e_0/e_1$ exceeds 10 decibels.

Since the outputs $e_0$ and $e_1$ of the amplifierdetectors, 9 and 10 represent the amplitude of the respective $f_0$ and $f_1$ components, it will be understood that the value of the right side of inequality (3) represents the signal-to-noise ratio.

If signal S is not received, we have $e_0 \approx e_1$ and $e_0/e_1$ is substantially 0 decibel. In this case, if the value of the right side of inequality (3) is set to 10 decibels no output is produced from the level comparator 21.

If noise N is received, the levels of $e_0$ and $e_1$ are increased, but since $e_0 \approx e_1$ no output will be produced from the level comparator 21.

If signal S is received, we have $e_0 > e_1$, and when the signal-to-noise ratio exceeds the reference level E (10 decibels) the level comparator 21 produces an output. In this way, the discrimination of signal S from noise N can be effected.

While the preceding embodiments of FIGS. 1 to 4 have concerned with the case of using a signal consisting of only a single frequency component at the frequency $f_0$, it is possible to effect similar discrimination of signal from noise by using a signal covering a frequency band $f_0 \pm \Delta f$ having a predetermined width $\Delta f$ instead of the single frequency $f_0$.

Further, similar discrimination of signal from noise can be obtained where there are a plurality of signal frequencies $f_1, f_2, \ldots$ instead of a signal frequency $f_0$, by providing means for selecting the respective frequencies $f_1, f_2, \ldots$ and means for selecting frequencies other than the signal frequencies $f_1, f_2, \ldots$.

Furthermore, while the preceding embodiments of FIGS. 1 to 4 have used band-pass filters as means for selecting frequencies $f_1$ and $f_2$ other than the signal frequency $f_0$, it is of course possible to use band-eliminate filters to band-block the frequency $f_0$.

As has been described, according to the invention signal and noise can be reliably discriminated from each other in the measurement of the distance of a moving object from a reference point, and it is possible to preclude the erroneous measurement in response to noise and ensure the correct measurement of the distance.

It will be understood that the invention can be applied not only where sound wave is sent forth toward reference points as in the preceding embodiments, but also similar measurement of the distance may be done by sending forth sound wave from a reference point toward a target or object and receiving the reflected wave from the object at the reference point.

Where successively arriving signals are discriminated from noise in the above way, there is a very important conception which is useful in improving the reliability of the discrimination, as will be described hereinafter.

In monitoring the position of a moving object as mentioned earlier, the distance of the object from one or more reference points is measured periodically at constant intervals. In this case, the maximum distance that can be traveled by the object during the period of the measurement cycle can be determined by the speed and other conditions of the object. Accordingly, the probability of mis-discriminating noise as signal may be reduced by so arranging as to receive only the waves that arrive during a predetermined interval corresponding to the maximum distance by which the moving object or target can travel, during the measurement cycle, about the measured value (representing distance or time) in the preceding measurement cycle. This aspect will now be described in detail in connection with FIG. 6.

Figure 6:
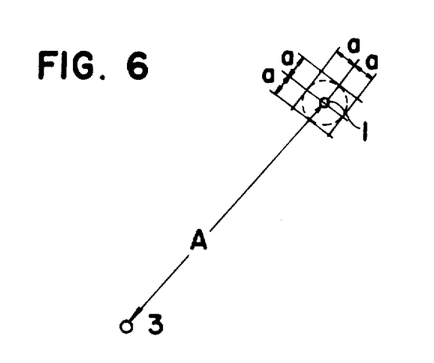
FIG. 6 is a view illustrating the principle of the distance measuring method to which the invention pertains.

The distance A between a moving object 1 and a receiver 3 is measured from the time taken for sound wave to propagate from the object 1 to the receiver 3. When executing the second measurement that is done similarly after 1 to 2 seconds after the preceding measurement, it can be known that the object 1 is within an area as shown enclosed within the dashed circle with its center at the position of the object 1 at the time of preceding measurement and its radius $a$ equal to the maximum distance that can be traveled by the object 1 during the period of the measurement cycle. If the object 1 has moved by the distance $a$ toward or away from the receiver 3 during the measurement cycle, the time required for sound wave to propagate from the object 1 to the receiver 3 in the second measurement differs, from the measured value $A_1$ (representing distance or time) obtained in the preceding measurement, by the time interval $\Delta T$ required for sound wave to propagate by the distance $a$.

If the period of the measurement cycle is constant (usually 1 to 2 seconds), the time interval $\Delta T$, that is, the maximum difference of the measured value from that in the preceding measurement can be known since the maximum distance $a$ that can be traveled by the object 1 during the measurement cycle is known, and it is given by $$\Delta T = VM/C .  \qquad (4)$$

where V is maximum speed of the object 1, M is period of the measuring cycle and C is speed of ultrasonic wave.

Thus, the measured value $A_2$ in the second measurement cycle is longer or shorter than the measured value $A_1$ in the first measurement cycle by the time interval $\Delta T$ or the distance $a$. In other words, the receiver 3 receives in the second measurement cycle only the waves which arrive within the predetermined period of $2\Delta T$ about the measured value $A_1$ in the preceding measurement cycle.

It is thus possible to sufficiently reduce the probability of mis-discriminating noise as signal, by so arranging as to receive only signals that arrive within a predetermined period corresponding to the maximum distance by which the object can travel, during the measurement cycle, about the measured value in the preceding measurement cycle.

Figure 7:
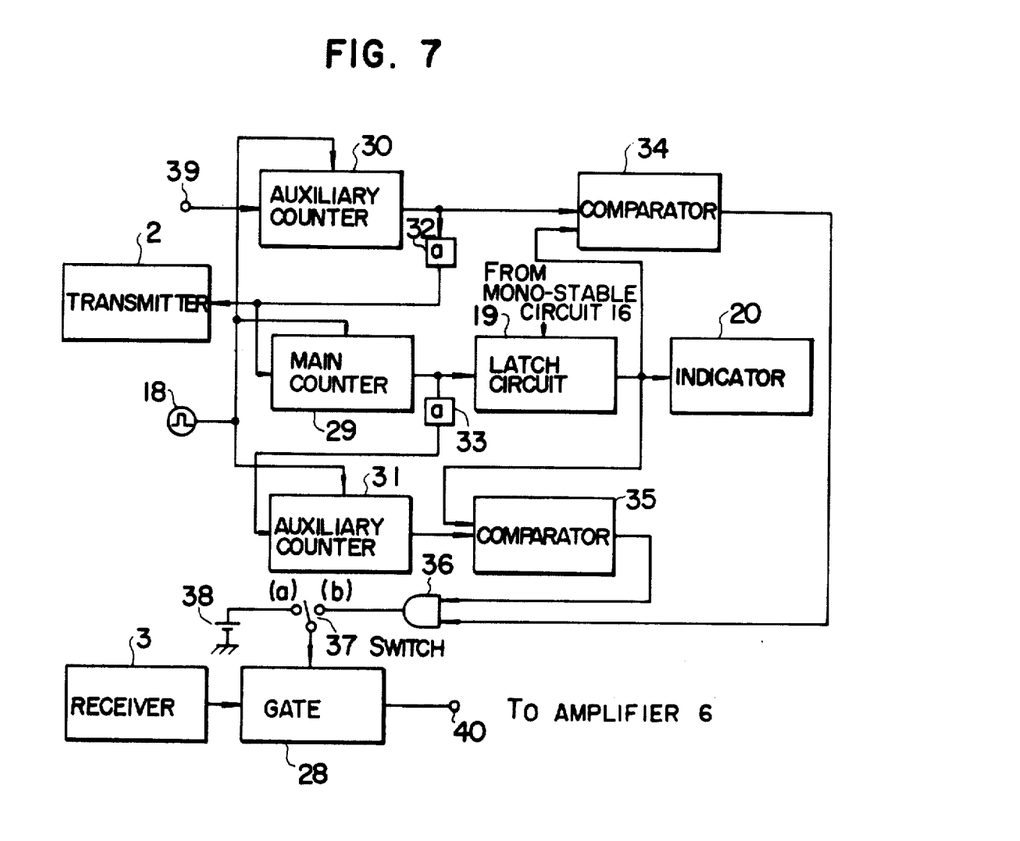
FIG. 7 is a block diagram showing a further embodiment of the invention.

FIG. 7 shows a further embodiment of the invention, in which the above concept is incorporated.

In FIG. 7, the same reference numerals as those in FIG. 1 designate like parts, numeral 28 a gate, numeral 29 a main counter, numerals 30 and 31 auxiliary counters which constitute together with the main counter 29 the counter 17 shown in FIG. 1, numerals 32 and 33 delay circuits, numerals 34 and 35 comparators, numeral 36 an AND gate, numeral 37 a switch, numeral 38 a D.C. power supply, numeral 39 an input terminal to which syncronizing pulses from the syncronizing pulse generator 5 shown in FIG. 1 are applied, and numeral 40 an output terminal connected to the amplifier 6 shown in FIG. 1.

Figure 8A:
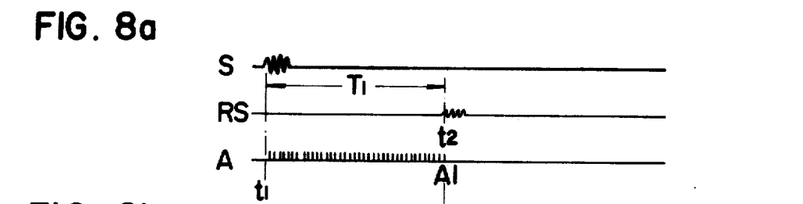
FIGS. 8a and 8b show time charts illustrating the operation of the embodiment of FIG. 7.

The operation of this circuitry will now be described referring to time charts shown in FIG. 8.

It is now assumed that the switch 37 is thrown to the side of contact ($a$), causing gate signal from the D.C. power supply 38 to be impressed on the gate 28 to open it, and that the syncronizing pulse generator 5 is caused to deliver at instant $t_1$ a syncronizing pulse (start signal) to the input terminal 39, causing the auxiliary counter 30 to start counting the clock pulses from the clock pulse generator 18. When the count of the auxiliary counter 30 reaches a value $a$, the delay circuit 32 produces a pulse output. The pulse output of the delay circuit 32 is coupled to the transmitter 2, causing the transmitter 2 to send forth a signal, while it is also coupled to the main counter 29, causing the main counter 29 to start counting the clock pulses from the clock pulse generator 18. When the count of the main counter 29 reaches $a$, the delay circuit 33 produces a pulse output which is given as count start command to the auxiliary counter 31.

When the receiver 3 receives signal S from the transmitter 2 at instant $t_2$ after the lapse of time $T_1$, the received signal RS is led through the gate 28 and output terminal 40 to the amplifier 6. The signal RS led to the amplifier 6 is subjected to the descrimination as to whether it is signal or noise by the method, for instance, as has been described in connection with FIG. 1. If the signal is identified as such, the mono-stable circuit 16 produces a pulse output to actuate the latch circuit 19 for reading out and memorizing the prevailing count $A_1$ of the main counter 29. The count $A_1$ represents the time $T_1$ taken for the ultrasonic signal US to propagate from transmitter 2 to receiver 3, and hence the distance of the moving object from the reference point at instant $t_1$. This count $A_1$ registered in the latch circuit 19 is displayed by the indicator 20.

When the measurement in this cycle is ended, the main counter 29 and auxiliary counters 30 and 31 are cleared and also the switch 37 is thrown to the side of contact ($b$) so that the system is now rendered ready for the next measurement.

When the next start signal is given to the input terminal 39 for the next measurement at a subsequent instant $t_3$, again the auxiliary counter 30 immediately starts counting, the main counter 29 starts counting upon reaching of the count of the auxiliary counter 30 to $a$, that is, after a delay time of $\Delta T$, and the auxiliary counter 31 starts counting upon reaching of the count of the main counter 29 to $a$. If the prevailing count of the main counter 29 is $A_n$, the prevailing count of the auxiliary counter 30 is $(A_n + a)$, and this count $(A_n + a)$ is compared, with the count $A_1$ memorized in the latch circuit 19, in the comparator 34. The comparator 34 produces an output if a relation $$A_n + a \geq A_1 \qquad (5)$$

is satisfied. Likewise, the comparator 35 compares the count $(A_n - a)$ of the auxiliary counter 31 and the content $A_1$ of the latch circuit 19, and it produces an output if a relation $$A_n - a \leq A_1 \qquad (6)$$

is satisifed. If the outputs of both comparators 34 and 35 appear and go to the AND gate 36, the AND gate 36 provides an output to the gate 28. Thus, it will be seen that the gate 28 is open if the inequalities 5 and 6 are simultaneously satisfied, that is, if a relation $$A_1 - a \leq A \leq A \quad a \qquad (7)$$

is satisfied. In other words, the gate 28 is open only for a period during which the prevailing count $A_n$ of the main counter 29 differs from the count $A_1$ obtained in the preceding measurement to an extent no greater than $\pm a$.

Figure 8B:
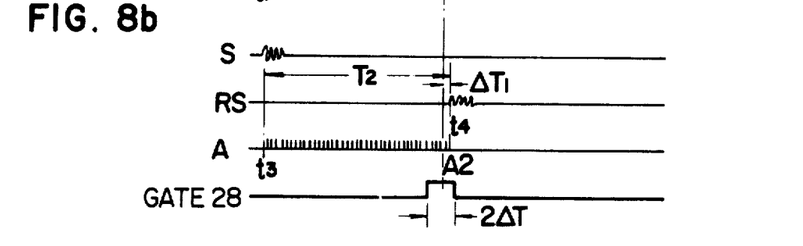

Thus, the gate 28 is held open during a predetermined period of $2\Delta T$ about the measured value $A_1$ in the preceding measurement cycle, as shown in FIG. 8b. When signal S is received by the receiver 3 at instant $t_4$ during the period of the open state of the gate 28, it is subjected to the discrimination as mentioned earlier, and if it is identified as desired signal the latch circuit 19 is actuated to erase the old content $A_1$ and memorize the new count $A_2$ of the main counter 29. The count $A_2$ registered in the latch circuit 19 is displayed by the indicator 20. In this way, the distance of the moving object from one or more reference points is repeatedly measured.

It will be appreciated that since the gate 28 is held open in each measurement cycle only for a predetermined period of $2\Delta T$ about the measured value in preceding measurement cycle and corresponding to the maximum distance $a$ that can be traveled by the moving object during the measurement cycle, the probability of mis-discriminating noise as signal may be reduced to improve the reliability of the discrimination.

If it happens that the measurement in the first measurement cycle is done in response to noise, it may become impossible to receive signals from the object in the subsequent measurement cycles since the erroneous count is registered in the latch circuit 19. However, the probability of mis-discriminating noise as signal in the first measurement cycle is low, and sufficient reliability can be ensured. If the reliability is felt insufficient, it may be further improved by initially measuring the distance of the object by some or other suitable means and comparing this measured value with the value measured in the first measurement cycle.

If no signal is received by the receiver 3 during the afore-mentioned predetermined period, the main counter 29 will not stop counting. In practice, however, this problem can be solved by using a ring counter as the main counter 29 and so arranging as to cause the main counter 29 and auxiliary counters 30 and 31 to be cleared when the count reaches the full scale.

As has been shown, where the time required for the transmission of successively transmitted signals is measured, the probability of mis-discriminating noise as signal can be reduced to improve the reliability of the signal discrimination by so within predetermined periods before and after a predicted instant of arrival of a new signal corresponding to the time required until the reception of the preceding signal in the preceding cycle.

Where only the signals that arrive within the predetermined period about the measured value in the preceding measuring cycle are received, however, a problem is encountered when the signal is intercepted or blocked by an obstruct intervening between the object and the reference point. In such case, not only the measurement of the distance of the object in that measurement cycle becomes impossible, but also the measurement in the next cycle may become impossible if the distance traveled by the object during the preceding two measurement cycles exceeds the maximum predicted distance a.

This problem, however, can be solved by having the delay time $\Delta T$ or $a$ of the delay circuits 32 and 33 variable so as to be able to increase the normal delay time $a$ in case if measurement fails to be done due to disturbance and reduce it back to the initial value $a$ when the measurement could be done in the succeeding measurement cycle.

Figure 9:
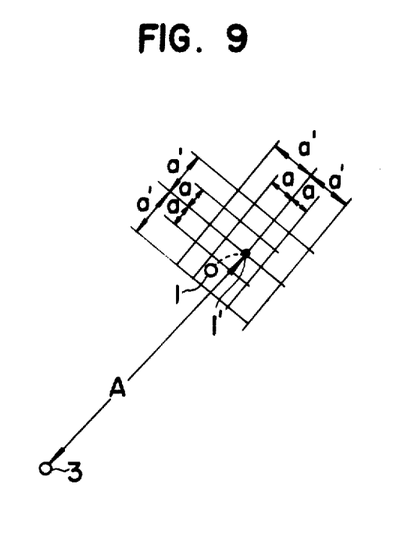
FIG. 9 is a view illustrating another aspect of the principle of the distance measuring method.

This will now be discussed in connection with FIG. 9. It is assumed that in the first measurement cycle a distance has been measured between the object 1' and the reference point and that the predicted range of the distance to be measured in the second measurement cycle has been $A \pm a$. If the measurement in the second cycle fails to be done due to a disturbance, it is apparent that the position of the object at the time of measurement in the third cycle is within the circle with the center at the position occupied by the object at the time of measurement in the first cycle and with a radius equal to $2a$.

Accordingly, if the measurement in one cycle fails to be done the measurement in the next cycle may be ensured by doubling the normal delay time for the next cycle, provided that no further disturbance takes place. By so doing and so arranging as to reduce the delay time back to the initial value for the succeeding measurements as soon as the measurement in that cycle is done, the afore-mentioned problem can be solved without spoiling the capability of reducing the probability of misdiscriminating noise as signal.

The afore-mentioned arrangement of taking up only the signals that arrive at the receiver during a predetermined period may also be incorporated, for instance where the transmitter 2 in FIg. 7 sends forth a signal as soon as the preceding signal is received by the receiver 3 and identified as a desired or true signal.

In such case, successive signals arrive at the receiver at progressively varying intervals due to the movement of the object. Accordingly, in this case the predetermined period for taking up signals arriving at the receiver may be set with respect to periods before and after a predicted instant of arrival of a new signal corresponding to the difference between the instant of reception of the preceding but one signal and the instant of reception of the preceding signal. By so doing, it is possible to reduce the probability of mis-discriminating noise as signal and improve the reliability of the signal discrimination.

Also, in this case having the predetermined period variable has similar effects as mentioned earlier.

Further, it is emphasized here that in case where signals are successively sent forth at constant interval it is possible to sufficiently reduce the probability of misdiscriminating noise as signal and improve the reliability of the signal discrimination by so arranging as to take out only the signals that arrive after the preceding signal within the predetermined periods before and after a predicted instant of arrival of a new signal corresponding to the constant interval.

As has been made apparent from the foregoing description of the invention applied to the measurement of distance between a moving object and one or more reference points, the invention is based on the difference in the frequence spectra of signal of sound or electromagnetic waves arriving at the receiver and noise, and it can ensure reliable discrimination of signal from noise by determining whether or not there are signal and a certain frequency component of noise or through comparison of their levels or by deriving the signal-to-noise ratio.

Also, where signals are successively sent forth, it is possible to further reduce the probability of misdiscriminating noise as signal and improve the reliability of the signal discrimination by so arranging as to predict the instant of arrival of signal and take out only the signals that arrive within predetermined periods before and after the predicted instant.

What we claim is:

1. A signal discriminating device which is employed with a system for measuring the time required until the reception of signals successively sent forth from a transmitter comprising a first selective amplifier means for selectively amplifying a first signal of a predetermined frequency, a second selective amplifier means for selectively amplifying a second signal of a frequency other than the predetermined frequency of said first signal, and a detecting means to detect the outputs of said first and second means, the output of said first means being identified as a desired signal when only said first means produces the output, and which further comprises a means through which only the signals arriving during predetermined periods before and after a predicted instant of arrival of a new signal corresponding to the time required until the reception of the preceding signal in the preceding measurement cycle are transmitted to said first and second means.

2. A signal discriminating device according to claim 1, wherein said predetermined periods are variable such that they can be increased if no signal is received during said predetermined periods.

3. A signal discriminating device which is employed with a system for measuring the time required until the reception of signals successively sent forth from a transmitter comprising a first selective amplifier means for selectively amplifying a first signal of a predetermined frequency, a second selective amplifier means for selectively amplifying a second signal of a frequency other than the predetermined frequency of said first signal, and a detecting means to detect the outputs of said first and second means, the output of said first means being identified as a desired signal when only said first means produces the output, and which further comprises a means through which only the signals arriving, after the preceding signal, during predetermined periods before and after a predicted instant of arrival of a new signal corresponding to the difference between the instant of reception of the preceding signal and the instant of reception of the preceding but one signal are transmitted to said first and second means.

4. A signal discriminating device according to claim 2, wherein said predetermined periods are variable such that they can be increased if no signal is received during said predetermined periods.

5. A signal discriminating device which is employed with a system for measuring the time required until the reception of signals successively sent forth from a transmitter at a constant interval, comprising a first selective amplifier means for selectively amplifying a first signal of a predetermined frequency, a second selective amplifier means for selectively amplifying a second signal of a frequency other than the predetermined frequency of said first signal, and a detecting means to detect the outputs of said first and second means, the output of said first means being identified as a desired signal when only said first means produces the output, and further comprising a means through which only the signals arriving, after the preceding signal, during predetermined periods before and after a predicted instant of arrival of a new signal corresponding to said constant interval are transmitted to said first and second means.

6. A signal discriminating device which is employed with a system for measuring the time required until the reception of signals successively sent forth from a transmitter, comprising a first selective amplifier means for selectively amplifying a first signal of a predetermined frequency, a second selective amplifier means for selectively amplifying a second signal of a frequency other than the predetermined frequency of said first signal, and a comparator means to compare the levels of the outputs of said first and second means, the output of said first means being identified as a desired signal only when the level of the output of said first means is higher than that of said second means and which further comprises a means through which only the signals arriving during predetermined periods before and after a predicted instant of arrival of a new signal corresponding to the time required until the reception of the preceding signal in the preceding measurement cycle are transmitted to said first and second means.

7. A signal discriminating device according to claim 6, wherein said predetermined periods are variable such that they can be increased if no signal is received during said predetermined periods.

8. A signal discriminating device which is employed with a system for measuring the time required until the reception of signals successively sent forth from a transmitter, comprising a first selective amplifier means for selectively amplifying a first signal of a predetermined frequency, a second selective amplifier means for selectively amplifying a second signal of a frequency other than the predetermined frequency of said first signal, and a comparator means to compare the levels of the outputs of said first and second means, the output of said first means being identified as a desired signal only when the level of the output of said first means is higher than that of said second means and which further comprises a means through which only the signals arriving, after the preceding signal, during predetermined periods before and after a predicted instant of arrival of a new signal corresponding to the difference between the instant of reception of the preceding signal and the instant of reception of the preceding but one signal are transmitted to said first and second means.

9. A signal discriminating device according to claim 8, wherein said predetermined periods are variable such that they can be increased if no signal is received during said predetermined periods.

10. A signal discriminating device which is employed with a system for measuring the time required until the reception of signals successively sent forth from a transmitter at a constant interval, comprising a first selective amplifier means for selectively amplifying a first signal of a predetermined frequency, a second selective amplifier means for selectively amplifying a second signal of a frequency other than the predetermined frequency of said first signal, and a comparator means to compare the levels of the outputs of said first and second means, the output of said first means being identified as a desired signal only when the level of the output of said first means is higher than that of said second means, and which further comprises a means through which only the signals arriving, after the preceding signal, during predetermined periods before and after a predicted instant of arrival of a new signal corresponding to said constant interval are transmitted to said first and second means.

11. A signal discriminating device which is employed with a system for measuring the time required until the reception of signals successively sent forth from a transmitter, comprising a first selective amplifier means for selectively amplifying a first signal of a predetermined frequency, a second selective amplifier means for selectively amplifying a second signal of a frequency lower than the predetermined frequency of said first signal, a third selective amplifier means for selectively amplifying a third signal of a frequency higher than the predetermined frequency of said first signal, and a mean level producing means to produce the means of the levels of the outputs of said second and third means, the output of said first means being identified as a desired signal only when the level of the output of said first means is higher than that of said mean level producing means, and which further comprises a means through which only the signals arriving during predetermined periods before and after a predicted instant of arrival of a new signal corresponding to the time required until the reception of the preceding signal in the preceding measurement cycle are transmitted to said first, second and third means.

12. A signal discriminating device according to claim 11, wherein said predetermined periods are variable such that they can be increased if no signal is received during said predetermined periods.

13. A signal discriminating device which is employed with a system for measuring the time required until the reception of signals successively sent forth from a transmitter, comprising a first selective amplifier means for selectively amplifying a first signal of a predetermined frequency, a second selective amplifier means for selectively amplifying a second signal of a frequency lower than the predetermined frequency of said first signal, a third selective amplifier means for selectively amplifying a third signal of a frequency higher than the predetermined frequency of said first signal, and a mean level producing means to produce the means of the levels of the outputs of said second and third means, the output of said first means being identified as a desired signal only when the level of the output of said first means is higher than that of said mean level producing means, and which further comprises means through which only the signals arriving after the preceding signal, during predetermined periods before and after a predicted instant of arrival of a new signal corresponding to the difference between the instant of reception of the preceding signal and the instant of reception of the preceding but one signal are transmitted to said first, second and third means.

14. A signal discriminating device according to claim 13, wherein said predetermined periods are variable such that they can be increased if no signal is received during said predetermined periods.

15. A signal discriminating device which is employed with a system for measuring the time required until the reception of signals successively sent forth from a transmitter at a constant interval, comprising a first selective amplifier means for selectively amplifying a first signal of a predetermined frequency, a second selective amplifier means for selectively amplifying a second signal of a frequency lower than the predetermined frequency of said first signal, a third selective amplifier means for selectively amplifying a third signal of a frequency higher than the predetermined frequency of said first signal, and a mean level producing means to produce the means of the levels of the outputs of said second and third means, the output of said first means being identified as a desired signal only when the level of the output of said first means is higher than that of said mean level producing means and which further comprises a means through which only the signals arriving, after the preceding signal, during predetermined periods before and after a predicted instant of arrival of a new signal corresponding to said constant interval are transmitted to said first and second means.

16. A signal discriminating device which is employed with a system for measuring the time required until the reception of signals successively sent forth from a transmitter, comprising a first selective amplifier means for selectively amplifying a first signal of a predetermined frequency, a second selective amplifier means for selectively amplifying a second signal of a frequency other than the predetermined frequency of said first signal, and a dividing means to divide the output of said first means by the output of said second means, the output of said first means being identified as a desired signal only when the level of the output of said dividing means is higher than a predetermined level, and further comprising a means through which only the signals arriving during predetermined periods before and after a predicted instant of arrival of a new signal corresponding to the time required until the reception of the preceding signal in the preceding measurement cycle are transmitted to said first and second means.

17. A signal discriminating device according to claim 16, wherein said predetermined periods are variable such that they can be increased if no signal is received during said predetermined periods.

18. A signal discriminating device which is employed with a system for measuring the time required until the reception of signals successively sent forth from a transmitter, comprising a first selective amplifier means for selectively amplifying a first signal of a predetermined frequency, a second selective amplifier means for selectively amplifying a second signal of a frequency other than the predetermined frequency of said first signal, and a dividing means to divide the output of said first means by the output of said second means, the output of said first means being identified as a desired signal only when the level of the output of said dividing means is higher than a predetermined level, and further comprising a means through which only the signals arriving, after the preceding signal, during predetermined periods before and after a predicted instant of arrival of a new signal corresponding to the difference between the instant of reception of the preceding signal and the instant of reception of the preceding but one signal are transmitted to said first and second means.

19. A signal discriminating device according to claim 18, wherein said predetermined periods are variable such that they can be increased if no signal is received during said predetermined periods.

20. A signal discriminating device which is employed with a system for measuring the time required until the reception of signals successively sent forth from a transmitter at a constant interval, comprising a first selective amplifier means for selectively amplifying a first signal of a predetermined frequency, a second selective amplifier means for selectively amplifying a second signal of a frequency other than the predetermined frequency of said first signal, and a dividing means to divide the output of said first means by the output of said second means, the output of said first means being identified as a desired signal only when the level of the output of said dividing means is higher than a predetermined level, and further comprising a means through which only the signals arriving, after the preceding signal, during predetermined periods before and after a predicted instant of arrival of the new signal corresponding to said constant interval are transmitted to said first and second means.

* * * * *